(12) United States Patent
Jean et al.

(10) Patent No.: US 11,603,639 B2
(45) Date of Patent: Mar. 14, 2023

(54) METHOD FOR INSTALLING A TUBULAR METAL PILE IN ROCKY SOIL

(71) Applicant: SAIPEM S.A., Montigny le Bretonneux (FR)

(72) Inventors: Olivier Jean, Le Perray en Yvelines (FR); Olivier Vambre, Les Mureaux (FR)

(73) Assignee: SAIPEM S.A., Montignyle (FR)

( * ) Notice: Subject to any disclaimer, the term of this patent is extended or adjusted under 35 U.S.C. 154(b) by 0 days.

(21) Appl. No.: 17/263,654

(22) PCT Filed: Mar. 12, 2019

(86) PCT No.: PCT/FR2019/050534
§ 371 (c)(1),
(2) Date: Jan. 27, 2021

(87) PCT Pub. No.: WO2020/025864
PCT Pub. Date: Feb. 6, 2020

(65) Prior Publication Data
US 2021/0292989 A1    Sep. 23, 2021

(30) Foreign Application Priority Data

Jul. 30, 2018   (FR) ...................................... 1857066

(51) Int. Cl.
*E02D 7/18*     (2006.01)
*E02D 5/28*     (2006.01)
(Continued)

(52) U.S. Cl.
CPC ............... *E02D 7/18* (2013.01); *E02D 5/285* (2013.01); *E02D 7/06* (2013.01); *E02D 13/04* (2013.01);
(Continued)

(58) Field of Classification Search
USPC ......................................................... 405/232
See application file for complete search history.

(56) References Cited

U.S. PATENT DOCUMENTS 2,360,803 A  * 10/1944 Steuerman .............. E02D 3/054
                                                                175/21
2002/0009337 A1* 1/2002 Fox .......................... E02D 3/08
                                                                405/232
(Continued)

FOREIGN PATENT DOCUMENTS

EP          2650446 A1   10/2013
FR          650485 A     1/1929
(Continued)

OTHER PUBLICATIONS https://www.macmillandictionary.com/us/dictionary/american/rocky (2022).*
(Continued)

*Primary Examiner* — Sean D Andrish
(74) *Attorney, Agent, or Firm* — Workman Nydegger

(57) ABSTRACT

The invention concerns a method for installing a tubular metal pile (28) in a rocky ground, successively comprising drilling the rocky ground (6) in order to form a cavity (14) of predetermined diameter and depth, filling the cavity with a granular material (18), arranging the granular material present in the cavity by vibration, and installing the pile in the cavity.

14 Claims, 3 Drawing Sheets

(51) Int. Cl.
*E02D 7/06* (2006.01)
*E02D 13/04* (2006.01)
*E02D 15/08* (2006.01)
*E02D 15/10* (2006.01)
*E02D 27/52* (2006.01)
*E02D 27/12* (2006.01)
*E02D 27/42* (2006.01)

(52) U.S. Cl.
CPC ............ *E02D 15/08* (2013.01); *E02D 15/10* (2013.01); *E02D 27/525* (2013.01); *E02D 27/12* (2013.01); *E02D 27/425* (2013.01); *E02D 2200/1685* (2013.01); *E02D 2250/00* (2013.01); *E02D 2250/0061* (2013.01); *E02D 2300/0026* (2013.01); *E02D 2300/0079* (2013.01)

(56) References Cited

U.S. PATENT DOCUMENTS

| | | | | |
|---|---|---|---|---|
| 2015/0218770 A1* | 8/2015 | Arslan | ............... | E02B 17/0034 405/211 |
| 2016/0040384 A1* | 2/2016 | Wagner | ................... | E02D 5/80 405/257 |
| 2017/0145650 A1* | 5/2017 | DeNeef | ................... | B06B 1/16 |
| 2017/0241098 A1* | 8/2017 | White | ................. | E02F 9/2004 |

FOREIGN PATENT DOCUMENTS

| | | | |
|---|---|---|---|
| GB | 2469190 | A | 10/2010 |
| JP | S59130918 | A | 7/1984 |
| JP | 60023522 | * | 2/1985 |
| JP | 60023522 | A | 2/1985 |
| JP | S60208515 | A | 10/1985 |
| JP | H0369717 | B2 | 11/1991 |
| JP | H0593424 | A | 4/1993 |
| JP | H09132916 | A | 5/1997 |
| JP | H10306445 | A | 11/1998 |
| JP | 2003221828 | A | 8/2003 |
| JP | 2003293354 | A | 10/2003 |
| JP | 2004239063 | A | 8/2004 |
| JP | 2008297856 | A | 12/2008 |
| JP | 2014088686 | A | 5/2014 |
| JP | 2014109143 | A | 6/2014 |
| JP | 2017214810 | A | 12/2017 |

OTHER PUBLICATIONS https://www.collinsdictionary.com/us/dictionary/english/ground (2022).*
https://www.thefreedictionary.com/soil (2022).*
https://www.thefreedictionary.com/granular (2022).*
https://www.dictionary.com/browse/cement (2022).*
International Search Report and Written Opinion from PCT Application No. PCT/FR2019/050534, dated May 31, 2019.
Search Report from corresponding FR Application No. FR1857066, dated Dec. 19, 2018.
Office Action from corresponding Japanese Application No. 2020-57177, dated Jan. 25, 2022.
Office Action from Japanese Application No. 2020-571777, dated Jan. 25, 2022.
Notice of Allowance from Japanese Application No. 2020-571777, dated Oct. 25, 2022.

* cited by examiner

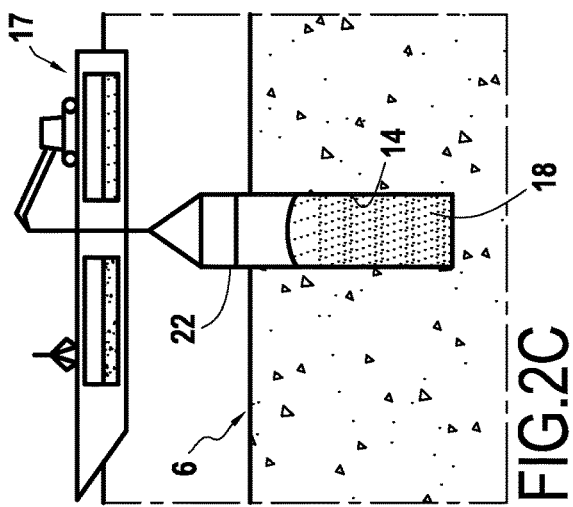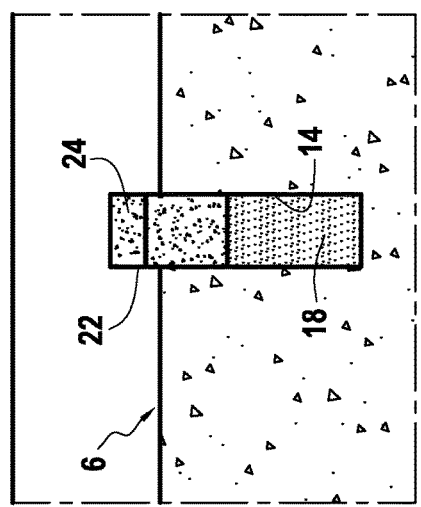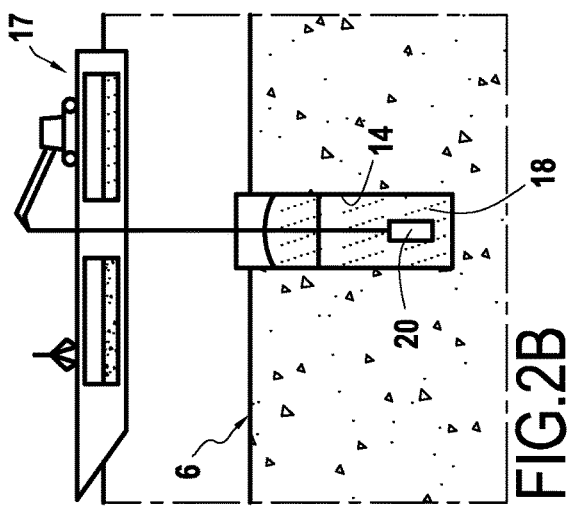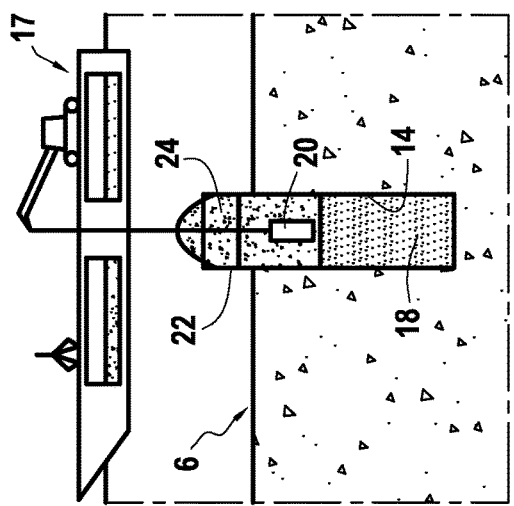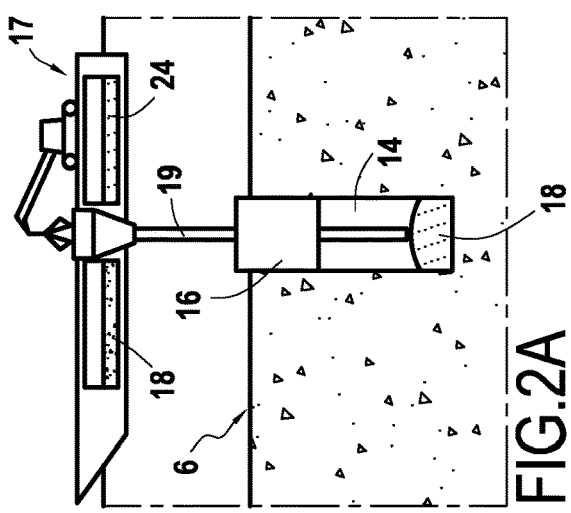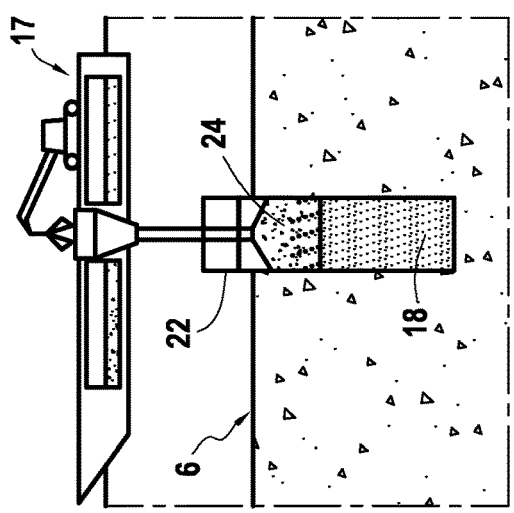

METHOD FOR INSTALLING A TUBULAR METAL PILE IN ROCKY SOIL

BACKGROUND OF THE INVENTION

The present invention relates to the general field of the installation of metal piles in a rocky ground, in particular at sea in a rocky seabed.

One field of application of the invention is that of placing the foundations of an offshore wind farm.

An offshore wind turbine is installed at sea by means of a foundation consisting of a tubular metal monopile of very large diameter, typically on the order of 7 to 8 m in diameter, which is inserted by about thirty meters deep in a rocky seabed.

Generally, the installation of such a pile consists essentially in drilling into the rocky seabed a bore of given diameter and depth in order to install the pile therein. This drilling is carried out from a barge supporting a drilling and cementing facility. Cement is then poured into the bore in order to embed the pile into the bore. When the bearing capacity of the thus installed pile is ensured by the behavior of the cement, the pile is released to be able to move the barge carrying the drilling and cementing facility up to the location of the next wind turbine.

However, this technique of placing the foundations of an offshore wind farm has many drawbacks. Particularly, drilling the bore and placing the pile therein leads to a risk of instability in the walls of the bore. In addition, this technique generates an overconsumption of cement during embedding of the pile into the seabed. In addition, the properties of cement tend to deteriorate in the marine environment and under cyclical conditions of swell and wind forces on the pile. In addition, this technique requires ensuring the verticality and the behavior of the pile during its embedding, which requires substantial tools and time.

PURPOSE AND SUMMARY OF THE INVENTION

The main aim of the present invention is therefore to propose a method for installing a metal pile which does not have such drawbacks.

According to the invention, this aim is achieved by means of a method for installing a tubular metal pile in a rocky ground, successively comprising drilling the rocky ground in order to form a cavity of predetermined diameter and depth, filling the cavity with a granular material, arranging the granular material present in the cavity by vibration, and installing the pile in the cavity.

The installation method according to the invention is remarkable in that it provides for replacing the rocky ground with a granular material (for example sand) whose mechanical characteristics are then improved during the arrangement step. The pile is then installed in the cavity filled with this granular material.

The method according to the invention thus has many advantages. Particularly:
  controlling the risk of instability of the walls of the bore by filling the latter with a granular material whose mechanical characteristics are then improved;
  eliminating the embedding of the pile with cement, which eliminates the drawbacks inherent in this type of embedding (particularly eliminating the setting time and the risks of degradation of the characteristics of the cement over time).

The method according to the invention therefore has better reliability, a major time saving compared to the installation methods of the prior art and flexibility of several installation facilities simultaneously.

The method according to the invention can be used in rocky grounds, either in the aquatic environment (for example for the installation of foundations of offshore wind turbines) or in the terrestrial environment (for example for the installation of telecommunications masts, onshore wind turbines, a power grid support/pylon, a cable car pylon, etc.).

The arrangement of the granular material in the cavity can be achieved during the installation of the pile. Alternatively, the arrangement of the granular material in the cavity can be achieved prior to the installation of the pile. In this case, the arrangement of the granular material in the cavity is achieved by vibro-compaction or dynamic compaction.

The pile can be installed by vibro-sinking into the cavity filled with the granular material. Alternatively, the pile can be installed by driving into the cavity filled with the granular material.

Preferably, installing the pile in the cavity successively comprises placing a guide, vertically inserting the pile through this guide, and placing the pile in the cavity.

Also preferably, the granular material comes from the material obtained from the drilling of the rocky ground.

BRIEF DESCRIPTION OF THE DRAWINGS

Other characteristics and advantages of the present invention will emerge from the description given below, with reference to the appended drawings which illustrate an exemplary embodiment thereof without any limitation. In the figures:

FIGS. 2A to 2F schematically illustrate different successive steps of the granular material filling and arrangement phases according to the method in accordance with the invention.

DETAILED DESCRIPTION OF THE INVENTION

The method according to the invention comprises three main steps, namely a main step of drilling a cavity, a main step of filling and arranging the cavity and an actual main step of installing the pile in the cavity.

FIGS. 1A to 1F schematically represent different successive sequences of an exemplary implementation of the main step of drilling a cavity.

In this exemplary embodiment, the tubular metal pile is installed at sea in a rocky seabed (it may be, for example, a foundation pile of an offshore wind turbine). Of course, the steps of the method according to the invention also apply to the land installation of a tubular metal pile in a rocky ground.

During a first sequence (FIG. 1A), a platform 2 supporting a drilling facility 4 is brought vertically to the rocky seabed 6.

Figure 1A:
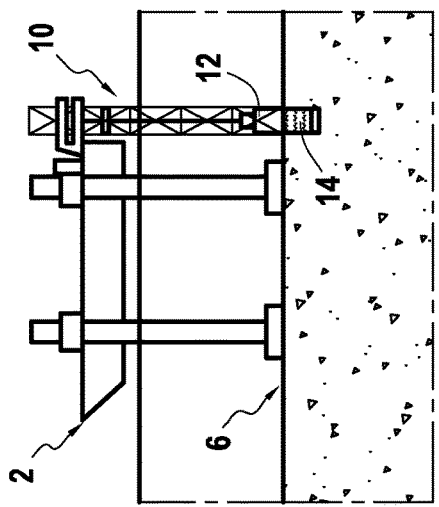
FIGS. 1A to 1F schematically illustrate different successive steps of the drilling phase according to the method in accordance with the invention.
Figure 1B:
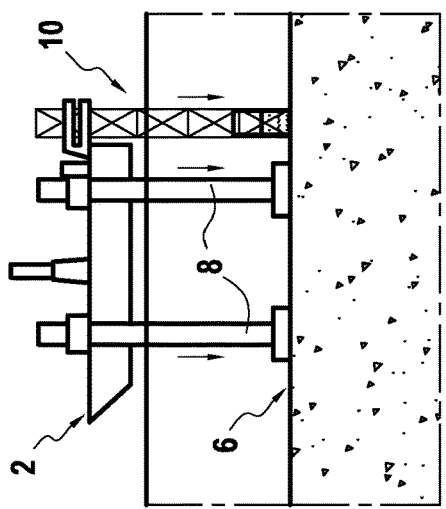
Figure 1C:
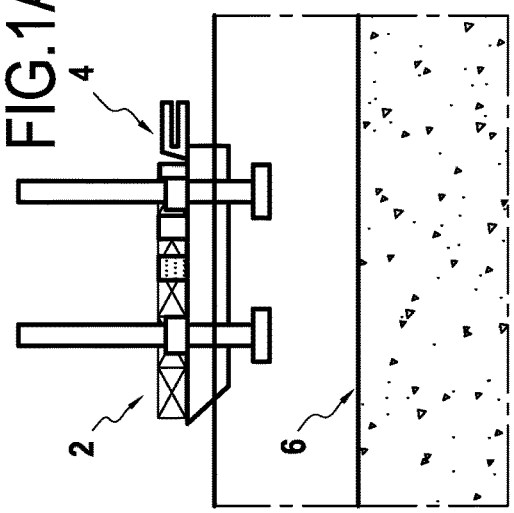

The platform 2 is of the jack-up type, that is to say it comprises legs 8 that bear on the rocky seabed 6 to allow lifting the platform 2 above sea level. A derrick 10 of the drilling facility is then lowered (FIG. 1B).

A drilling head 12 is then lowered into the derrick 10 and the drilling of the rocky seabed 6 to form a cavity 14 of predetermined diameter and depth begins (step 1C).

Figure 1D:
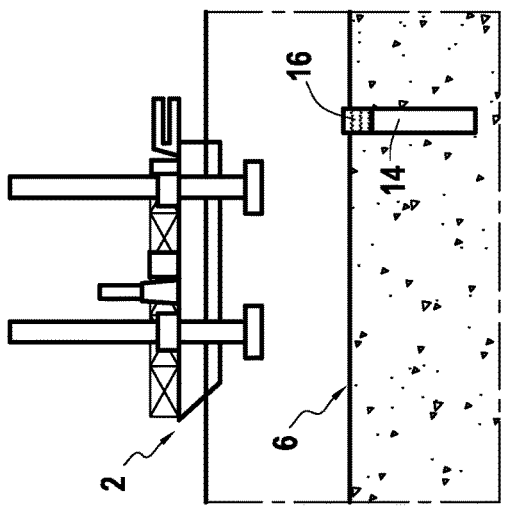
Figure 1E:
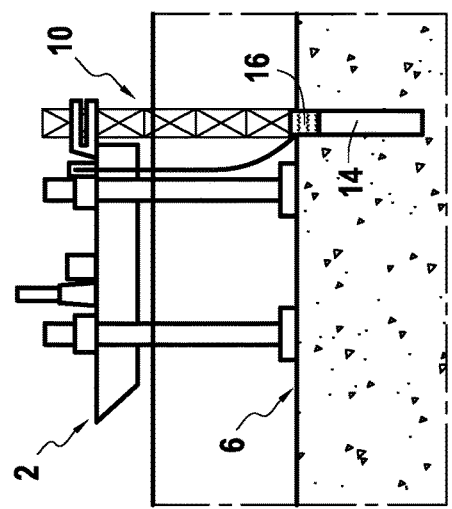
Figure 1F:
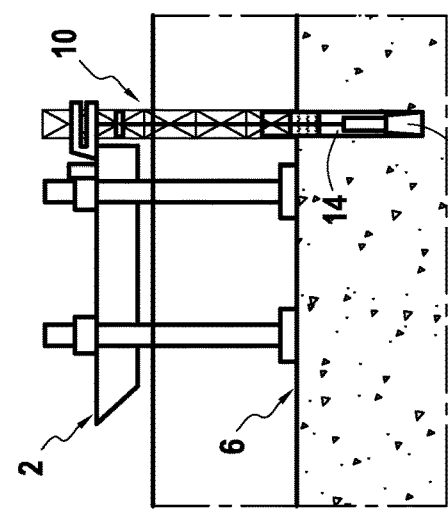

FIG. 1D represents the end of the actual drilling operation: the cavity 14 is at its final dimensions (diameter and depth), that is to say the diameter and depth of the drilled cavity are respectively greater than the diameter and final depth of burial of the pile. For example, in the case of an application to the installation of a monopile foundation of an offshore wind turbine, the cavity may have a diameter of 7 to 8 m for a depth of 25 to 35 m.

During the following sequence (FIG. 1E), the drilling head 12 is pulled up onboard the platform and an annular guide 16 is mounted at the upper end of the cavity 14. Such a guide is a functional equipment which will have the function of stabilizing the upper part of the cavity if necessary and of guiding the operations of filling and placing the pile.

Finally, the derrick 10 of the drilling facility can be pulled up, the legs 8 be raised (FIG. 1F) and the platform 2 is conveyed to another pile installation site.

FIGS. 2A to 2F schematically represent different successive sequences of an exemplary implementation of the main step of filling and arranging the previously formed cavity.

This step requires placing, above the cavity 14, a ship 17 for transporting granular material 18. This granular material can be for example imported sand or come directly from the material obtained from the drilling of the rocky ground, in which case it may have undergone prior treatment.

During a first sequence (FIG. 2A), the ship 17 discharges inside the cavity 14 the granular material 18 transported (or reconditioned and stored in the ship 17 if it is the drilling material). This operation is for example carried out by means of a duct 19 connecting the bottom of the cavity to the ship.

Once the cavity is almost completely filled with the granular material, the duct 19 is pulled up onboard the ship and an arrangement of this granular material is carried out (FIG. 2B). For example, this arrangement is achieved by vibro-compaction or dynamic compaction of the granular material.

The vibro-compaction is a known technique for generating an arrangement of the granular material having filled the cavity. This method is a mass treatment which consists in immersing a vibrator 20 (or vibrating needle) into the cavity filled with granular material to emit vibrations in order to rearrange the grains in order of density of the material having filled the cavity.

The dynamic compaction (not represented in the figures) is another known technique for generating a settlement of the granular material present in the cavity under the effect of the input of high energies. Typically, in order to create high-energy waves in the cavity, a mass of several tons is dropped several times on the granular material.

Once the arrangement operation is complete, the height of granular material present in the cavity 14 is lower than before this operation.

During the next sequence (FIG. 2C), a sinkhole 22 is installed at the upper end of the cavity 14 to help filling the rest of it with another granular material, for example gravel 24 (FIG. 2D).

The gravel 24 then undergoes an arrangement operation as described above (vibro-compaction or dynamic compaction), for example by means of a vibrator 20 as represented in FIG. 2E. The gravel on the upper part of the cavity is a more draining material allowing water to flow more easily by "drainage effect". At the end of this sequence, the height of the gravel 24 present in the upper part of the cavity 14 is lower than before this operation and the ship 17 can then be moved to another pile installation site (FIG. 2F).

It will be noted that the sequence of arrangement of the granular material in the cavity can be performed before (as described above) or during the pile installation step described below.

FIGS. 3A to 3D schematically represent different successive sequences of an exemplary implementation of the actual main step of installing the pile in the previously formed and arranged cavity.

This step requires placing, above the cavity 14, a ship 26 for installing the metal, tubular and hollow pile 28 (the ship for transporting granular material having been previously conveyed to another site).

Figure 3A:
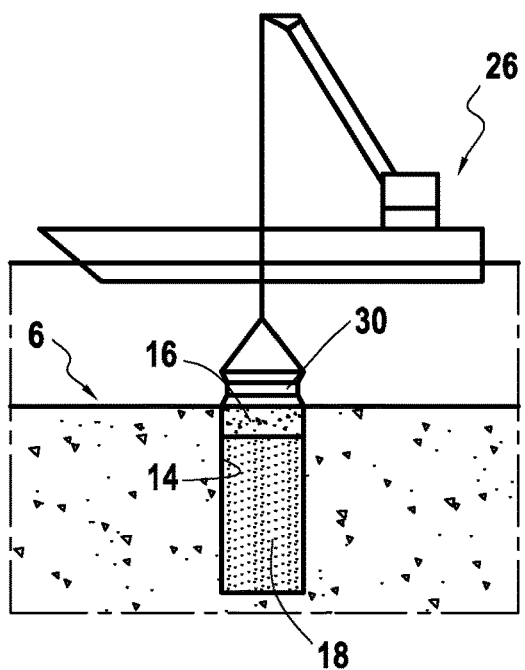
FIGS. 3A to 3D schematically illustrate different successive steps of the pile installation phase according to the method in accordance with the invention.
Figure 3B:
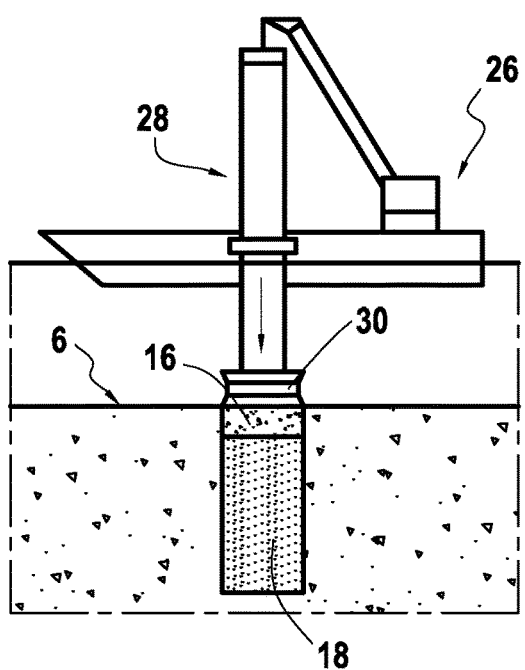
Figure 3C:
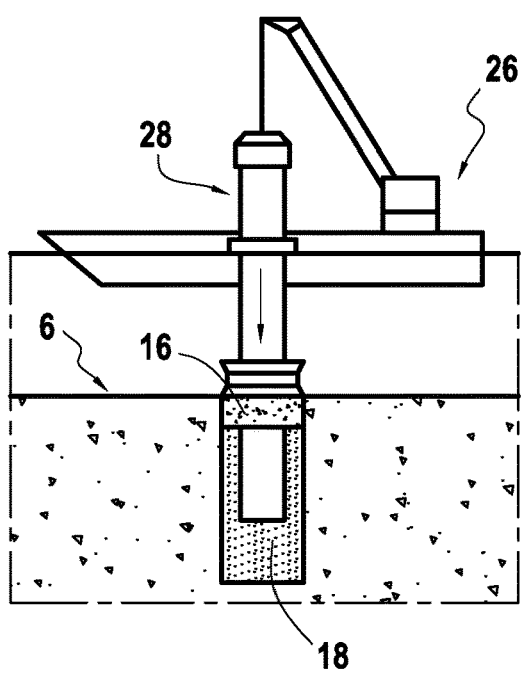

A first sequence may consist in installing a guide 30 at the upper end of the cavity 14 (FIG. 3A). This guide 30 serves to guide the pile during its installation.

The tubular and hollow metal pile 28 is then inserted into the cavity (FIG. 3B) and guided vertically (FIG. 3C) to penetrate therein to a predetermined depth. Since the pile is hollow, the granular material present in the cavity is housed both between the pile and the cavity and inside the pile.

The insertion of the pile into the cavity filled with the arranged granular material is carried out by vibro-sinking or driving. The vibro-sinking is a technique known in the construction industry and public works for sinking piles by high-frequency and low-amplitude vibration. As for the driving, it is another known technique consisting in sinking a pile into the ground by dynamic effect of shocks or vibrations. The shocks are generally obtained by the drop of the drop hammer on a pile cap and the vibrations by a disposition called a vibrator or pile hammer.

Figure 3D:
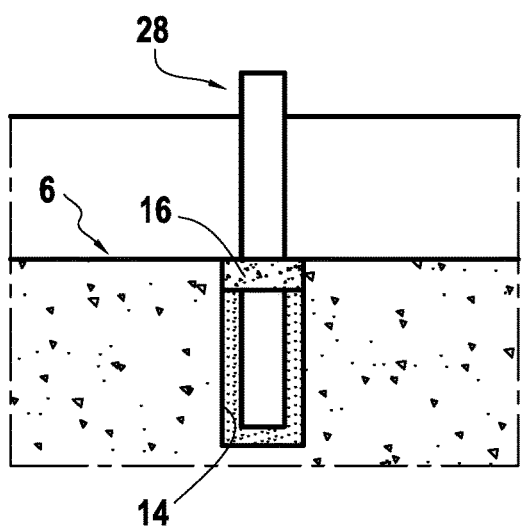

The insertion of the pile is then stopped once the desired insertion depth is reached and the ship 26 is moved to another pile installation site (FIG. 3D).

The invention claimed is:

1. A method for installing a tubular metal pile in the ground, successively comprising:
   drilling the ground in order to form a cavity of predetermined diameter and depth, wherein the diameter and depth of the cavity are respectively greater than a diameter and final depth of burial of the pile;
   mounting an annular guide at an upper end of the cavity, wherein the annular guide stabilizes the upper end of the cavity;
   filling a first portion of the cavity with a first granular material;
   arranging the first granular material present in the cavity by vibration; then
   filling a second portion of the cavity with a second granular material;
   arranging the second granular material present in the cavity by vibration; and then
   installing the pile in the cavity.

2. The method according to claim 1, wherein the pile is installed at sea in a seabed.

3. The method according to claim 1, wherein the pile is installed onshore in the ground.

4. The method according to claim 1, wherein the arrangement of the first and second granular materials in the cavity is achieved during the installation of the pile.

5. The method according to claim 1, wherein the arrangement of the first and second granular materials in the cavity is achieved prior to the installation of the pile.

6. The method according to claim 5, wherein the arrangement of the first and second granular materials in the cavity is achieved by vibro-compaction.

7. The method according to claim 5, wherein the arrangement of the first and second granular materials in the cavity is achieved by dynamic compaction.

8. The method according to claim 1, wherein the pile is installed by vibro-sinking into the cavity filled with the first and second granular materials.

9. The method according to claim 1, wherein the pile is installed by driving into the cavity filled with the first and second granular materials.

10. The method according to claim 1, wherein installing the pile in the cavity successively comprises vertically inserting the pile through the annular guide and placing the pile in the cavity.

11. The method according to claim 1, wherein the first granular material comes from the material obtained from the drilling of the ground.

12. The method according to claim 1, wherein the step of arranging the first and second granular materials present in the cavity by vibration rearranges the first and second granular materials in order of density.

13. The method according to claim 1, wherein the first granular material is sand.

14. The method according to claim 1, wherein the second granular material is gravel.

\* \* \* \* \*